United States Patent
Rangineni et al.

(10) Patent No.: US 11,039,393 B1
(45) Date of Patent: Jun. 15, 2021

(54) LOW ENERGY POWER SAVING FAST RECONNECT FOR WIRELESS COMMUNICATIONS DEVICES

(71) Applicant: Cypress Semiconductor Corporation, San Jose, CA (US)

(72) Inventors: Balasubramanyam Rangineni, Bangalore (IN); Rohit Gupta, New Delhi (IN)

(73) Assignee: Cypress Semiconductor Corporation, San Jose, CA (US)

(*) Notice: Subject to any disclaimer, the term of this patent is extended or adjusted under 35 U.S.C. 154(b) by 0 days.

(21) Appl. No.: 16/718,644

(22) Filed: Dec. 18, 2019

(51) Int. Cl.
*H04W 52/02* (2009.01)
*H04W 76/19* (2018.01)
*H04W 76/30* (2018.01)
*H04W 92/18* (2009.01)

(52) U.S. Cl.
CPC ....... *H04W 52/0235* (2013.01); *H04W 76/19* (2018.02); *H04W 76/30* (2018.02); *H04W 92/18* (2013.01)

(58) Field of Classification Search
CPC . H04W 52/0235; H04W 76/19; H04W 76/30; H04W 92/18
See application file for complete search history.

(56) References Cited

U.S. PATENT DOCUMENTS

| | | | |
|---|---|---|---|
| 2005/0049013 A1* | 3/2005 | Chang | H04W 52/0216 455/574 |
| 2015/0103708 A1* | 4/2015 | Kang | H04W 72/0433 370/311 |
| 2016/0381144 A1* | 12/2016 | Malik | H04L 12/189 455/517 |
| 2020/0084697 A1* | 3/2020 | Sridhara | H04W 4/80 |

* cited by examiner

Primary Examiner — Mandish K Randhawa

(57) ABSTRACT

Systems, methods, and devices suspend and establish wireless communications connections. Methods include determining at least a first wireless communications device should be transitioned to a low power mode, and transitioning, using second logic, first logic of the first wireless communications device to the low power mode. The first logic implements a host stack of a wireless communications protocol, the second logic implements a controller stack of the wireless communications protocol, and the transitioning to the low power mode includes suspending a communications connection between the first wireless communications device and a second wireless communications device. Methods also include transitioning the first logic of the first wireless communications device to an active mode. The transitioning to the active mode reestablishes the communications connection between the first wireless communications device and a second wireless communications device.

20 Claims, 6 Drawing Sheets

US 11,039,393 B1

LOW ENERGY POWER SAVING FAST RECONNECT FOR WIRELESS COMMUNICATIONS DEVICES

TECHNICAL FIELD

This disclosure generally relates to wireless communications devices, and more specifically, to reducing power consumption of wireless communications devices.

BACKGROUND

Wireless communications devices may communicate with each other via one or more communications modalities, such as a WiFi connection or a Bluetooth connection.

Accordingly, such wireless communication may be implemented in a manner compliant with a wireless communication protocol. Moreover, such wireless communications devices may include various hardware components to facilitate such communication. For example, wireless communications devices may include transmission media that may include one or more antennas. Conventional techniques for establishing and reestablishing connectivity between wireless communication devices remain limited because they are not able to efficiently reestablish connections.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Figure 1:
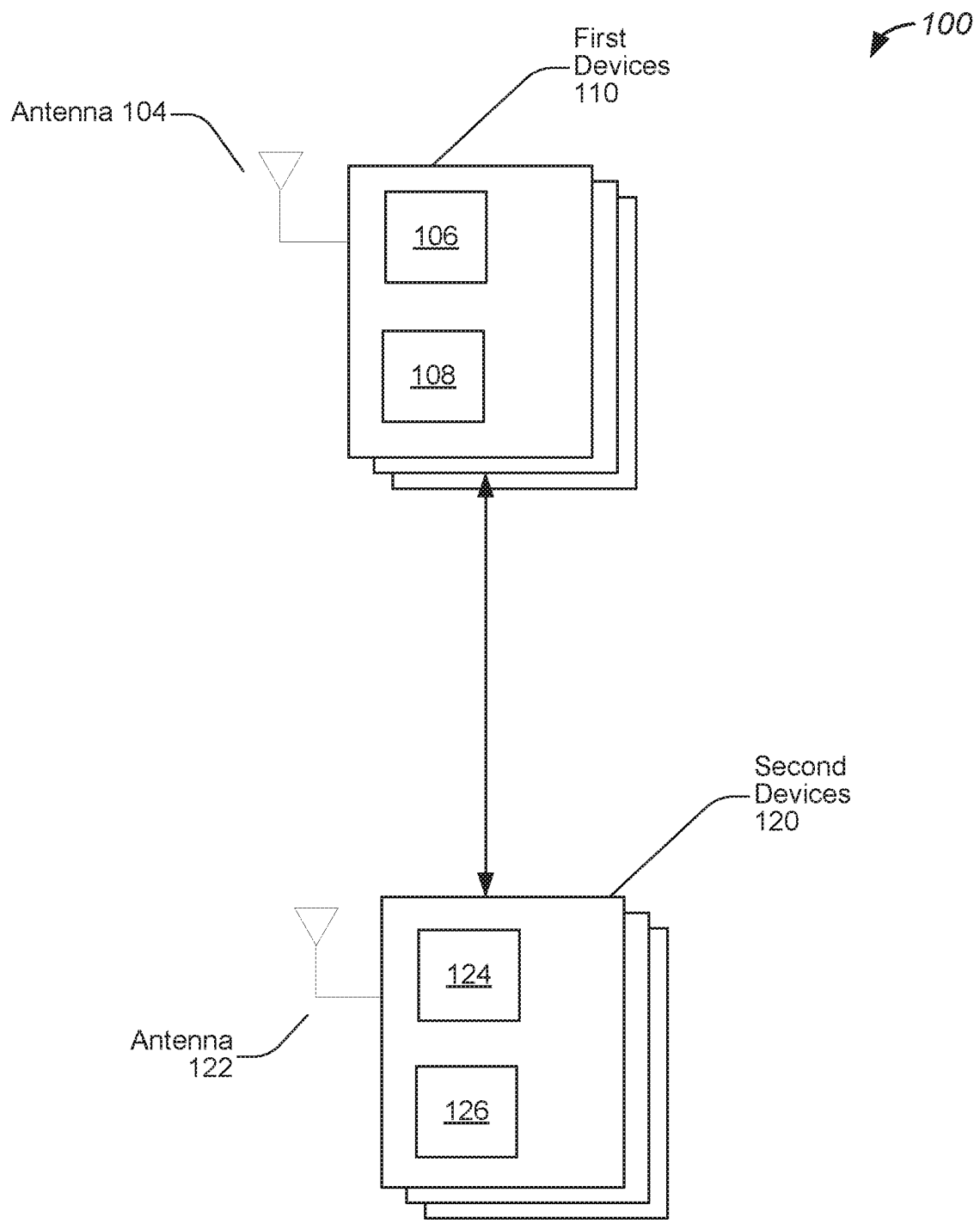
FIG. 1 illustrates an example of a system for power saving fast connection of wireless communications devices, configured in accordance with some embodiments.

FIG. 1 illustrates an example of a system for power saving fast connection of wireless communications devices, configured in accordance with some embodiments. As discussed above, various wireless communications devices may communicate with each other via one or more wireless communications media. For example, wireless communications devices may communicate with each other via a WiFi connection or a Bluetooth connection. In various embodiments, the wireless communications devices may first establish connections or communications links before data transfer occurs. As will be discussed in greater detail below, wireless communications devices disclosed herein and systems, such as system 100, that implement such wireless communications devices are configured to establish and reestablish connections with reduced power consumption. Accordingly, embodiments disclosed herein enable the entering and exiting of a low power mode, such as a deep sleep mode, as well as the establishment of a connection after such a transition with reduced power consumption.

In various embodiments, system 100 may include first devices 110 which may be wireless communications devices. As discussed above, such wireless communications devices may be compatible with one or more wireless transmission protocols, such as a WiFi protocol or a Bluetooth protocol. In some embodiments, first devices 110 are low energy Bluetooth devices that are compatible with a Bluetooth Low Energy specification and protocol, also referred to as Bluetooth Smart. Moreover, such wireless communications devices may be smart devices, such as those found in wearable devices, or may be monitoring devices, such as those found in smart buildings, environmental monitoring, and energy management. It will be appreciated that such wireless communications devices may be any suitable device, such as those found in cars, other vehicles, and even medical implants.

As shown in FIG. 1, various wireless communications devices may be in communication with each other via one or more wireless communications mediums. As shown in FIG. 1, first devices 110 may each include an antenna, such as antenna 104. First devices 110 may also include processing device 108 as well as transceiver 106. As will be discussed in greater detail below, such processing devices, transceivers, and radios may be configured to establish communications connections with other devices, and transmit data in the form of data packets via such communications connections. More specifically, as will be discussed in greater detail below with reference to FIG. 3 as well as FIGS. 4-6, different components of first devices 110, such as a baseband and controller stack, may be configured to implement different portions of connection establishment and reestablishment so that reestablishment of a connection after exiting a low power mode does not utilize the host stack or its underlying processor logic, which may be implemented using a processor core, and overall power consumption is reduced.

In some embodiments, system 100 may further include second devices 120 which may also be wireless communications devices. As similarly discussed above, second devices 120 may be compatible with one or more wireless transmission protocols, such as a WiFi protocol or a Bluetooth protocol. Moreover, second devices 120 may also be smart devices or other devices, such as those found in cars, other vehicles, and medical implants. In various embodiments, second devices 120 may be different types of devices than first devices 110. As discussed above, each of second devices 120 may include an antenna, such as antenna 122, as well as processing device 126 and transceiver 124, which may also be configured to establish communications connections with other devices, and transmit data in the form of data packets via such communications connections. As discussed above, second devices 120 may also be configured to implement different portions of connection establishment and reestablishment so that reestablishment of a connection after exiting a low power mode does not utilize the host stack or its underlying processor logic, and overall power consumption is reduced.

Figure 2:
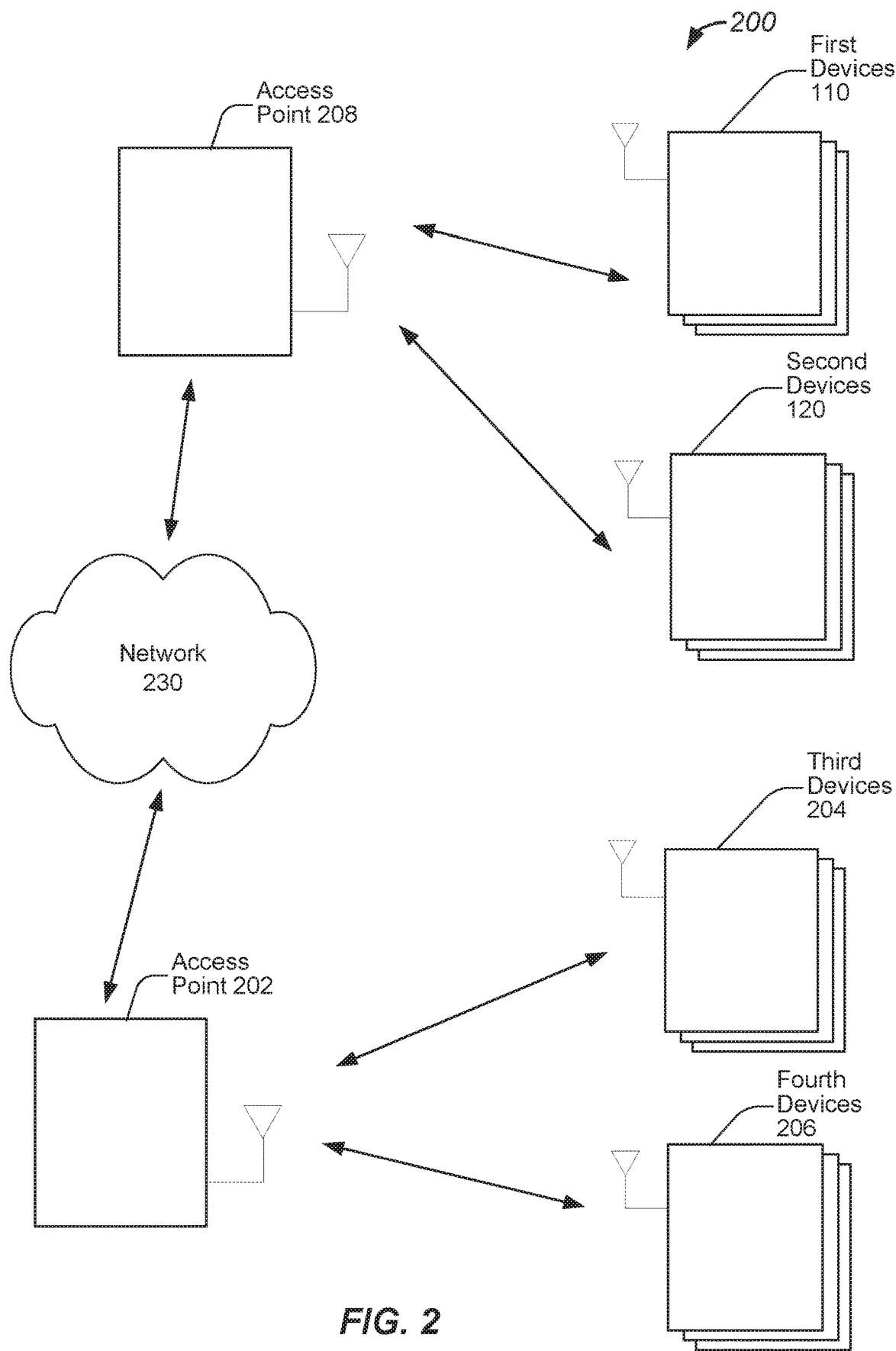
FIG. 2 illustrates an example of another system for power saving fast connection of wireless communications devices, configured in accordance with some embodiments.

FIG. 2 illustrates an example of another system for power saving fast connection of wireless communications devices, configured in accordance with some embodiments. In various embodiments, system 200 may include first devices 110 and second devices 120. System 200 further includes various access points, such as access point 208 that is configured to manage communication between first devices 110 and second devices 120, and a communications network, such as network 230. Accordingly, many wireless communications devices may be in communication with each other over a widely implemented communications network, such as the internet.

In various embodiments, system 200 further includes access point 202, third devices 204, and fourth devices 206. As similarly discussed above, access point 202 may be configured to manage communication between third devices 204 and fourth devices 206, and a communications network, such as network 230. Accordingly, as shown in FIG. 2, system 200 may include multiple access points that are coupled with multiple different groups of devices. In this way, various devices may communicate with each other via network 230, and such communication may be managed and scheduled by access points, such as access point 202 and access point 208. In some embodiments, the access points may pass along communications and requests between each other to facilitate the scheduling of network traffic across numerous different devices. For example, access point 202 may schedule requests from first devices 110, second devices 120, third devices 204, and fourth devices 206 where requests and traffic from first devices 110 and second devices 120 are passed along through access point 208.

Figure 3:
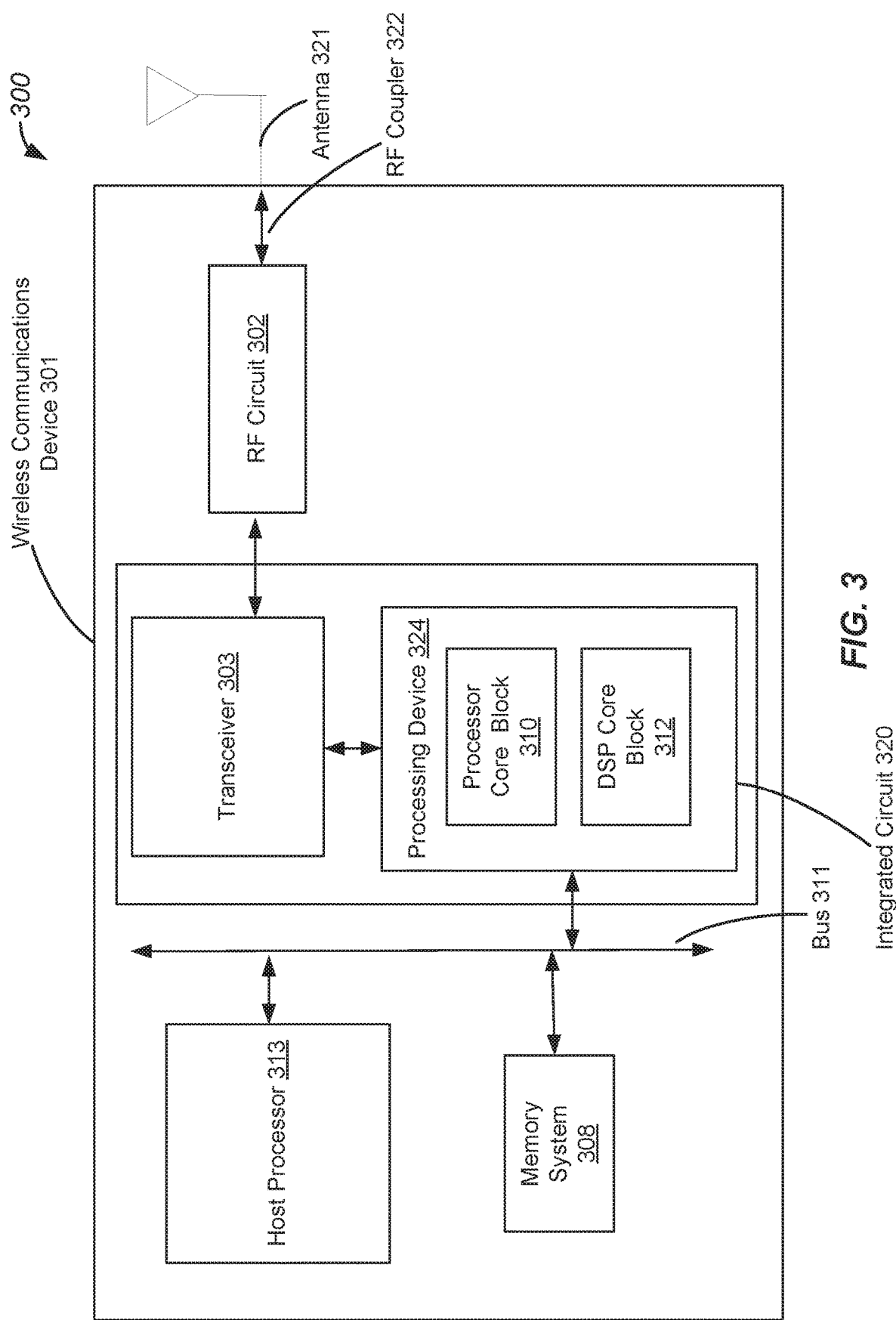
FIG. 3 illustrates an example of yet another system for power saving fast connection of wireless communications devices, configured in accordance with some embodiments.

FIG. 3 illustrates an example of yet another system for power saving fast connection of wireless communications devices, configured in accordance with some embodiments. More specifically, FIG. 3 illustrates an example of a system, such as system 300, that may include wireless communications device 301. It will be appreciated that wireless communications device 301 may be one of any of first devices 110, second devices 120, third devices 204, or fourth devices 206 discussed above. In various embodiments, wireless communications device 301 includes a transceiver, such as transceiver 303, which may be a transceiver such as transceivers 106 and 124 discussed above. In one example, system 300 includes transceiver 303 which is configured to transmit and receive signals using a communications medium that may include antenna 321. As noted above, transceiver 303 may be included in a Bluetooth radio, and may be compatible with a Bluetooth Low Energy communications protocol. In some embodiments, transceiver 303 may be compatible with a WiFi protocol, such as an 802.11ax protocol. Accordingly, transceiver 303 may include components, such as a modulator and demodulator as well as one or more buffers and filters, that are configured to generate and receive signals via antenna 321.

In various embodiments, system 300 further includes processing device 324 which may include logic implemented using one or more processor cores. Accordingly, processing device 324 is configured to implement first logic and second logic, as will be discussed in greater detail below. In various embodiments, processing device 324 includes one or more processing devices that are configured to implement connection establishment, disconnection, and reestablishment operations that will be described in greater detail below. In various embodiments, processing device 324 includes one or more components configured to implement a medium access control (MAC) layer that is configured to control hardware associated with a wireless transmission medium, such as that associated with a WiFi transmission medium. In one example, processing device 324 may include processor core block 310 that may be configured to implement a driver, such as a Bluetooth and/or WiFi driver. Processing device 324 may further include digital signal processor (DSP) core block 312 which may be configured to include microcode.

In various embodiments, processor core block 310 comprises multiple processor cores which are each configured to implement specific portions of a wireless protocol interface. For example, a Bluetooth protocol may be implemented using a Bluetooth stack in which software is implemented as a stack of layers, and such layers are configured to compartmentalize specific functions utilized to implement the Bluetooth communications protocol. In various embodiments, a host stack is implemented using a first processor within processor core block 310, and a controller stack is implemented using a second processor within processor core block 310. The host stack includes layers for a Bluetooth network encapsulation protocol, radio frequency communication, service discovery protocol, as well as various other high level data layers. The controller stack includes a link management protocol, a host controller interface, a link layer which may be a low energy link layer, as well as various other timing critical layers.

Thus, according to various embodiments, the operations of the host stack and the controller stack may be implemented on two different processor cores of processor core block 310. In this way, the management of establishment of a connection, disconnection, and reestablishment of the connection is compartmentalized to a single processor core of processor core block 310, and power consumption is reduced because both processor cores are not utilized for these operations.

System 300 further includes radio frequency (RF) circuit 302 which is coupled to antenna 321. In various embodiments, RF circuit 302 may include various components such as an RF switch, a diplexer, and a filter. While FIG. 3 illustrates system 300 as having a single antenna, it will be appreciated that system 300 may have multiple antennas. Accordingly, RF circuit 302 may be configured to select an antenna for transmission/reception, and may be configured to provide coupling between the selected antenna, such as antenna 321, and other components of system 300 via a bus, such as bus 311.

System 300 includes memory system 308 which is configured to store one or more data values associated with connection management operations discussed in greater detail below. Accordingly, memory system 308 includes storage device, which may be a non-volatile random access memory (NVRAM) configured to store such data values, and may also include a cache that is configured to provide a local cache. In various embodiments, system 300 further includes host processor 313 which is configured to implement processing operations implemented by system 300.

It will be appreciated that one or more of the above-described components may be implemented on a single chip, or on different chips. For example, transceiver 303 and processing device 324 may be implemented on the same integrated circuit chip, such as integrated circuit chip 320. In another example, transceiver 303 and processing device 324 may each be implemented on their own chip, and thus may be disposed separately as a multi-chip module or on a common substrate such as a printed circuit board (PCB). It will also be appreciated that components of system 300 may be implemented in the context of a low energy device, a smart device, or a vehicle such as an automobile. Accordingly, some components, such as integrated chip 320, may be implemented in a first location, while other components, such as antenna 321, may be implemented in second location, and coupling between the two may be implemented via a coupler such as RF coupler 322.

Figure 4:
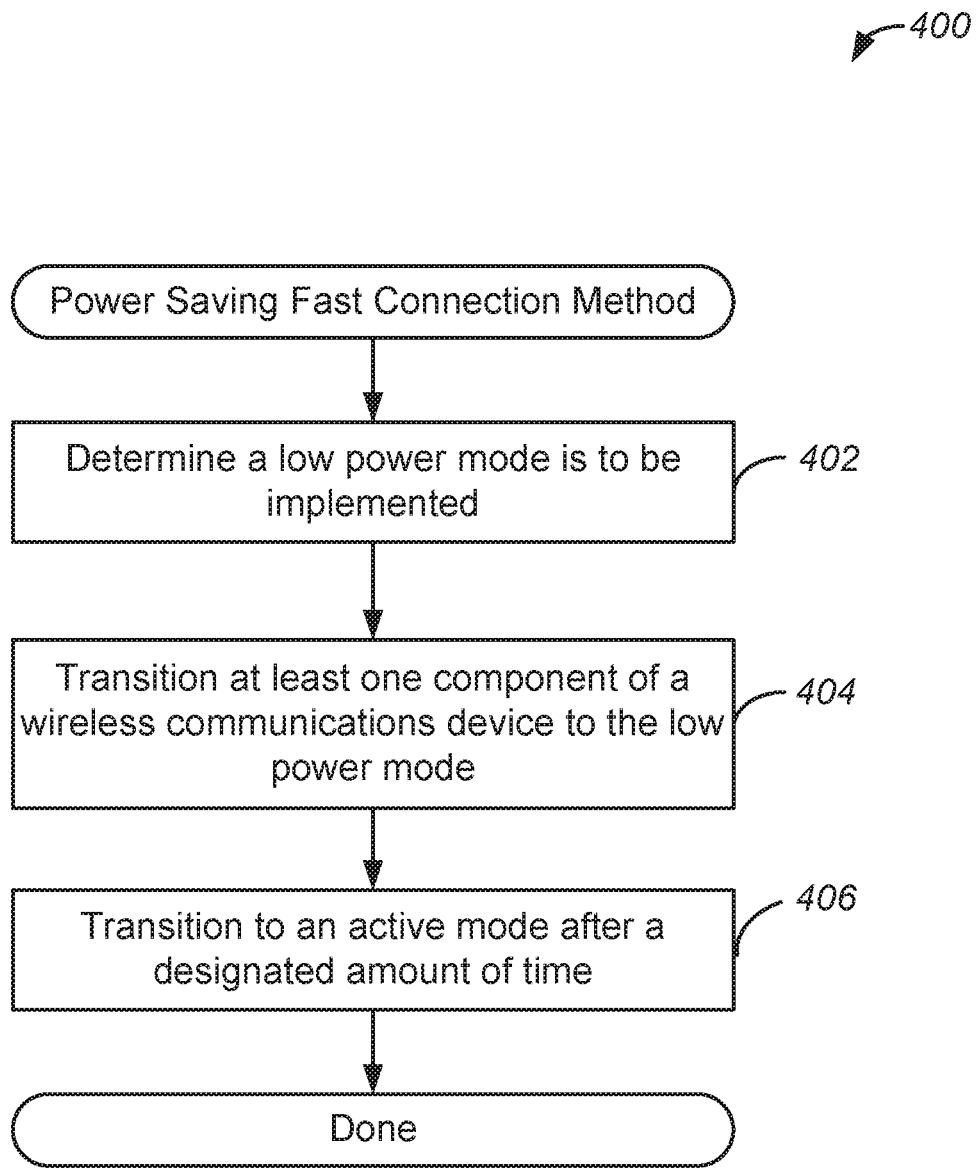
FIG. 4 illustrates an example of a method for power saving fast connection of wireless communications devices, implemented in accordance with some embodiments.

FIG. 4 illustrates an example of a method for power saving fast connection of wireless communications devices, implemented in accordance with some embodiments. As discussed above, various wireless communications devices may communicate with each other via one or more wireless communications media. Moreover, the wireless communications devices may first establish connections or communications links before data transfer occurs, and may disconnect to implement a low power mode. As will be discussed in greater detail below, once exiting low power mode, connections may be reestablished with reduced power consumption. Accordingly, embodiments disclosed herein enable the entering and exiting of a low power mode, such as a deep sleep mode, with reduced power consumption.

Accordingly, method 400 may commence with operation 402 during which it may be determined if a low power mode is to be implemented. In various embodiments, the determination may be made by a system component, such as processing device 324 discussed above, which may be included in a wireless communications device. For example, an application executed, at least in part, by a host processor coupled to the processing device may send a message to the processing device. First logic of processor core block 310 may receive the message, and determine, based on the message, that a low power mode should be implemented.

Method 400 may proceed to operation 404 during which at least one component of a wireless communications device may be transitioned to the low power mode. Accordingly, the wireless communications device at which the determination was made at operation 402 may communicate with other wireless communications devices with which it is connected. In one example, a first wireless communications device may be a master device, and it may be connected to several other wireless communications devices which may be slave devices. During operation 404, the master device may command the slave devices to suspend a connection, and may also command them to enter a low power mode, such as deep sleep. Moreover, one or more baseband disconnection operations may be implemented, and a low power mode may be entered in which the logic underlying the host stack may be powered down.

Method 400 may proceed to operation 406 during which an active mode may be transitioned to after a designated amount of time. In various embodiments, during operation 404, the master and slave devices may have identified a designated amount of time to wait to reestablish a connection. Additional details regarding the determination of the designated amount of time are discussed in greater detail below with reference to FIG. 5. Accordingly, after a designated amount of time has elapsed, the master and slave devices may power up their respective logic underlying the host stacks, and may reestablish the connection.

Figure 5:
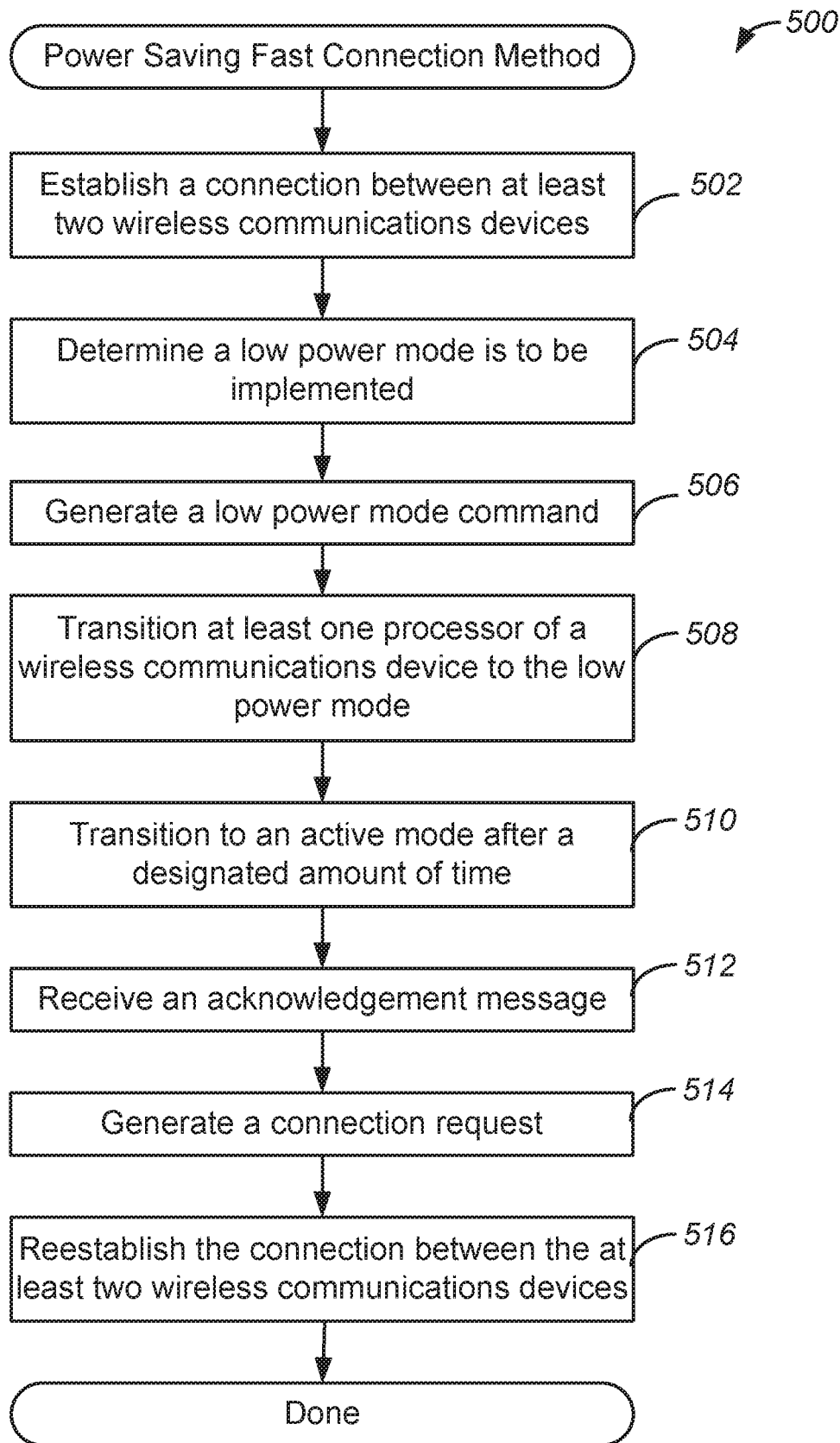
FIG. 5 illustrates an example of another method for power saving fast connection of wireless communications devices, implemented in accordance with some embodiments.

FIG. 5 illustrates an example of another method for power saving fast connection of wireless communications devices, implemented in accordance with some embodiments. As discussed above, various wireless communications devices may communicate with each other via one or more wireless communications media. Moreover, the wireless communications devices may first establish connections or communications links, and may disconnect to implement a low power mode. As will be discussed in greater detail below, once exiting low power mode, connections may be reestablished with reduced power consumption.

Accordingly, method 500 may commence with operation 502 during which a connection may be established between at least two wireless communications devices. As will be discussed in greater detail below with reference to FIG. 6, wireless communications devices may communicate with each other to establish a communications link or connection that may be used to transmit and receive data as data packets compatible with a wireless transmission protocol, such as a Bluetooth protocol. In some embodiments, at least two wireless communications devices may have a hierarchical relationship. For example, a first device may be a master device and a second device may be a slave device.

Method 500 may proceed to operation 504 during which it may be determined if a low power mode should be implemented. As similarly discussed above, the determination may be made by a system component, such as a processing device, which may be included in a wireless communications device. For example, an application executed, at least in part, by a host processor coupled to the processing device may send a message to the processing device. A processor may receive the message, and determine, based on the message, that a low power mode should be implemented. In one example, a first processor may be configured to implement a host stack, and may receive the message from the application. The first processor may then issue a command to a second processor configured to implement a controller stack. In this way, the message and determination may be relayed to the second processor.

Method 500 may proceed to operation 506 during which a low power mode command may be generated. In various embodiments, one or more components of the first device may generate a low power mode command and may transmit that command to the second device. As discussed above, the first device may be a master device and the second device may be a slave device. Accordingly, the master device may generate and transmit the command to the slave device. As discussed above, the second processor may be used to implement a link layer, and operations of the link layer may be configured to implement a specific low power mode command. For example, the low power mode request may be configured to identify a wake time at which the slave device should exit the low power mode, transition to an active mode, and begin broadcasting an advertisement signal. In this way, the master and slave device may coordinate and agree upon a designated period of time for which the low power mode should be implemented.

In various embodiments, the low power mode command is transmitted from a link layer of the master device to a link layer of the slave device. For example, the low power mode command may be a power save command, and may be transmitted and received without the use of host stacks or their underlying processors. In this way, the processors underlying the host stacks are not utilized for the disconnection and reestablishment of communications links, and the use of higher level protocols such as generic attribute profile (GATT) and security manager protocol (SMP) procedures is not required thus further reducing power consumption.

In various embodiments, the duration of the designated period of time is determined based on one or more operational characteristics of the wireless communications devices. For example, the designated period of time may be determined based on power characteristics of the wireless communications devices, operational voltages of the processor cores, as well as operational frequencies of the transceivers. In various embodiments, additional characteristics may be utilized as well, such as stand by current consumption and active current consumption, which may also be related to characteristics such as output power at a transmitter of the wireless communications device, distance between wireless communications devices, and interference from the environment in which the wireless communications devices are implemented.

In some embodiments, the designated period of time may be determined based on the operational characteristics described above as well as an estimate of a duration of time after which the implementation of method 500 results in a reduction of overall power consumption. For example, one or more parameters may be determined based on initially stored specification data during a device configuration, or based one or more measurements taken by wireless communications device itself. Such parameters may include an average power consumed during operations that occur during reestablishment of a communications link, such as advertisement and GATT/SMP procedures, an average power consumed while a connection is active, and a time taken to reconnect. These parameters may have been previously measured and stored in memory by a technician or user during a configuration of the wireless communications device. In some embodiments, the parameters may have been determined by the wireless communications device based on measurements of previous activity. Furthermore, the parameters may be calculated based on a data table stored in memory that identifies power consumption data for each of a range of operational frequencies and voltages of the processor cores. As noted above, such a data table may have been stored during a configuration process. In various embodiments, the utilization of the previously described parameters may be implemented using an equation, such as equation 1 described below:

$$T_{dpslp} > \frac{P_{adv}}{P_{conn}} * T_{reconnect} \tag{1}$$

In various embodiments, $T_{dpslp}$ is the duration of the designated period of time that is being determined. As shown in equation 1, $T_{dpslp}$ may be determined such that it is greater than the ratio of an average power consumed during operations that occur during reestablishment of a communications link (given by $P_{adv}$) and an average power consumed while a connection is active (given by $P_{conn}$) multiplied by a time taken to reconnect or reestablish a connection (given by $T_{reconnect}$). Accordingly, the duration of the designated period of time may be set to be greater than the power ratio described above multiplied by the estimated reconnect time.

Method 500 may proceed to operation 508 during which at least one processor of a wireless communications device may be transitioned to the low power mode. As discussed above, the wireless communications device at which the determination was made may communicate with other wireless communications devices with which it is connected. In one example, the master device may command the slave device to suspend a connection, and may also command the slave device to enter a low power mode, such as a deep sleep mode. During this operation, the processors underlying the host stacks may be powered down and enter a low power or sleep mode. In this way, one or more disconnection operations may be implemented, and a low power mode may be entered in which processors underlying host stacks are unpowered while processors underlying controller stacks are powered down for a designated period of time. In various embodiments, when powered down, the processors may be in a deep sleep mode in which they operate with reduced power.

Method 500 may proceed to operation 510 during which at least one processor of a wireless communications device may be transitioned to an active mode. In various embodiments, during operation 506, the master and slave devices may have identified a designated amount of time to wait to reestablish a connection. Accordingly, after a designated amount of time has elapsed, the master and slave devices may transition their respective processors underlying the controller stacks back to an active mode. Accordingly, processors underlying the controller stacks may be woken and transitioned to the active mode.

Method 500 may proceed to operation 512 during which an acknowledgement message may be received. As discussed above, the wireless communications devices may include a slave device, and once in the active mode, the slave device may begin transmitting an advertisement signal that indicates that it is available to establish a connection. The signal may be broadcast to multiple other devices, and in this way, the slave device may advertise its availability to one or more other devices, such as a master device. Accordingly, the master device may receive the acknowledgement signal from the slave device.

Method 500 may proceed to operation 514 during which a connection request may be generated. Accordingly, in response to receiving the acknowledgement message, the master device may transmit a message to the slave device. The message may include a connection request, and the message may be implemented using a Bluetooth communications protocol. In some embodiments, the slave device may receive the connection request, and may generate and transmit a reply message in response to receiving the connection request to confirm that it can comply with the connection request. In various embodiments, the transmitting/receiving of the connection request and the transmitting/receiving of the reply message are handled by the respective second processors underlying the controller stacks of the master device and the slave device.

Method 500 may proceed to operation 516 during which a connection between at least two wireless communications devices may be reestablished. According to various embodiments, the master device may implement one or more synchronization operations in accordance with a wireless transmission protocol, such as a Bluetooth protocol. Moreover, the processors underlying the controller stacks of the master device and the slave device may issue a command to the processors underlying the host stacks of the master device and the slave device to wake the processors underlying the host stacks and transition them to an active mode. Accordingly, once the synchronization operations have been implemented, and the processors underlying the host stacks have transitioned to an active mode, the master device and the slave device may begin utilizing the reestablished connection to transmit and receive data.

Figure 6:
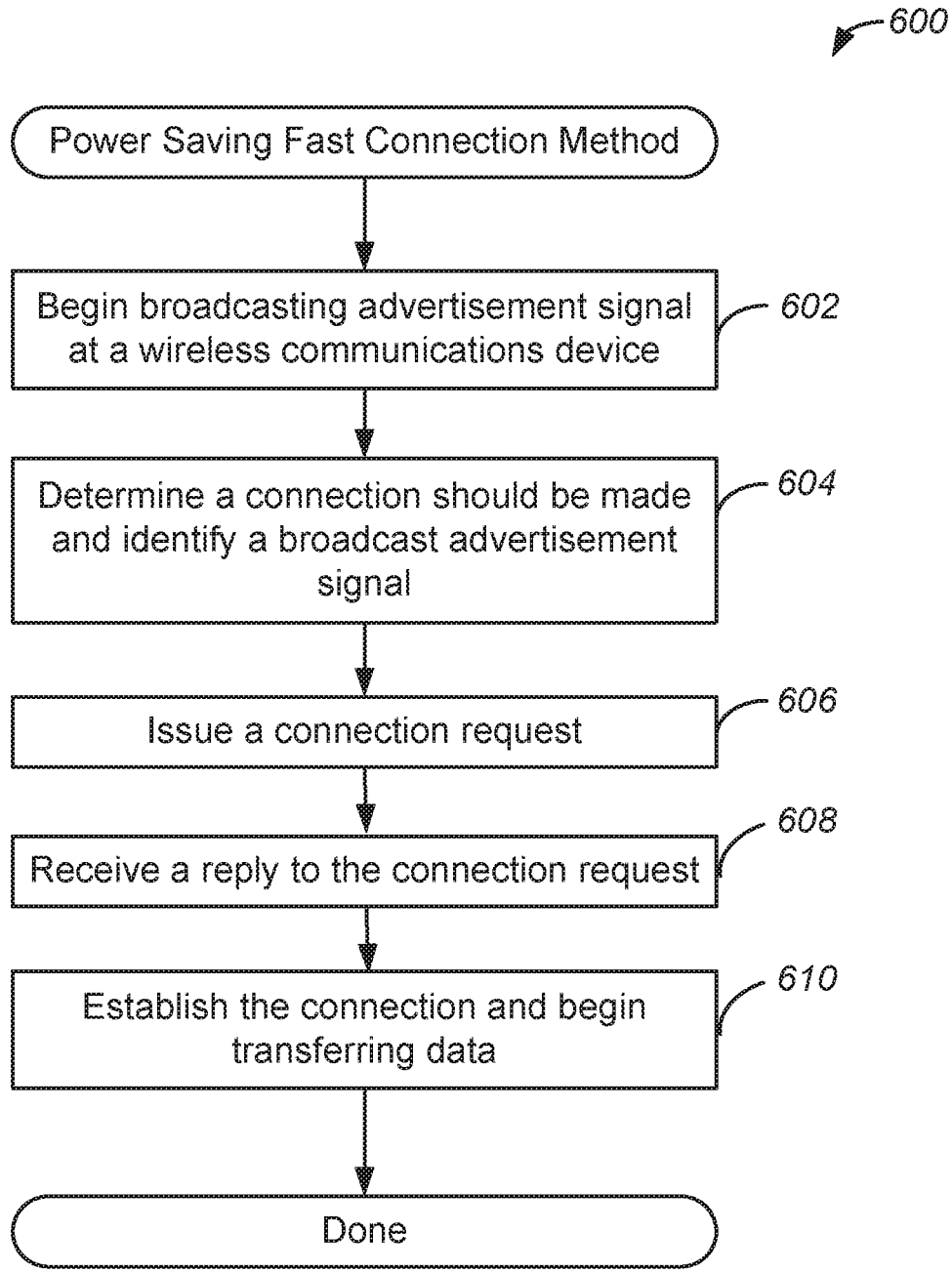
FIG. 6 illustrates an example of yet another method for power saving fast connection of wireless communications devices, implemented in accordance with some embodiments.

FIG. 6 illustrates an example of yet another method for power saving fast connection of wireless communications devices, implemented in accordance with some embodiments. As discussed above, wireless communications devices may interact with each other to establish communications links and connections. Additional details are provided below regarding operations that may be implemented when establishing a connection.

Accordingly, method 600 may commence with operation 602 during which a wireless communications device may begin broadcasting an advertisement signal. In various embodiments, the wireless communications devices may be a slave device that begins to transmit and advertisement signal that indicates that it is available to establish a connection, and advertises this condition to one or more other devices, such as a master device.

Method 600 may proceed to operation 604 during which the advertisement signal may be identified, and it may be determined if a connection should be made. Accordingly, during operation 604 a master device may receive and identify the advertisement signal broadcast by the slave device. In response to receiving the signal, the master device may determine if a connection should be established. In one example, such a determination may be made based on whether or not any data should be transmitted to the slave device, as may be determined based on one or more queued operations or messages.

Method 600 may proceed to operation 606 during which a connection request may be transmitted. Accordingly, in response to determining a connection should be made, the master device may transmit a message to the slave device. The message may include a connection request, and the message may be implemented using a Bluetooth communications protocol. In some embodiments, the slave device may receive the connection request, and may generate and transmit a reply message in response to receiving the connection request.

Method 600 may proceed to operation 608 during which a reply to the connection request may be received. In various embodiments, the master device may receive the reply message from the slave device. Once received, the master device may interpret the receiving of the reply message as an acknowledgement thus confirming that the slave device is available and is ready to establish a connection.

Method 600 may proceed to operation 610 during which the requested connection may be established. Accordingly, the master device may implement one or more synchronization operations in accordance with a wireless transmission protocol, such as a Bluetooth protocol. Once synchronized, the master device and the slave device may begin utilizing the connection to transmit and receive data.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   determining at least a first wireless communications device should be transitioned to a low power mode;
   transitioning first logic of the first wireless communications device to the low power mode using second logic of the first wireless communications device, the first logic implementing a host stack of a Bluetooth wireless communications protocol, the second logic implementing a controller stack of the Bluetooth wireless communications protocol, and the transitioning to the low power mode comprising suspending a communications connection between the first wireless communications device and a second wireless communications device; and
   transitioning the first logic of the first wireless communications device to an active mode after a designated period of time determined based on estimated average power characteristics of the first and second wireless communications devices during reestablishment of the communications connection and while the communications connection is active, the transitioning to the active mode reestablishing the communications connection between the first wireless communications device and the second wireless communications device.

2. The method of claim 1, wherein the transitioning of the first logic to the low power mode causes a first logic of the second wireless communications device to transition to the low power mode, wherein the first logic implements a host stack of the wireless communications protocol.

3. The method of claim 2, wherein the transitioning of the first logic to the active mode causes the first logic of the second wireless communications device to transition to the active mode.

4. The method of claim 2, wherein the transitioning of the first logic of the first wireless communications device and the first logic of the second wireless communications device to the low power mode further comprises:
   transmitting a low power mode command from a link layer of the first wireless communications device to a link layer of the second wireless communications device.

5. The method of claim 4, wherein the designated period of time is specified in the low power mode command.

6. The method of claim 5, wherein the transitioning of the first logic to the active mode further comprises:
   transmitting a command from the controller stack to the host stack of the first wireless communications device.

7. The method of claim 6, wherein the transitioning of the first logic to the active mode is responsive to receiving the command.

8. The method of claim 1, wherein the wireless communications protocol is a Bluetooth Low Energy protocol.

9. The method of claim 1, wherein the first logic and the second logic are processor cores included in the first wireless communications device.

10. A wireless communications device comprising:
    an antenna;
    a transceiver configured to send and receive signals via the antenna;
    a processing device comprising:
      a first logic configured to implement a host stack of a Bluetooth wireless communications protocol, and the first logic configured to:
        determine at least a first wireless communications device should be transitioned to a low power mode; and
      a second logic configured implement a controller stack of the Bluetooth wireless communications protocol, and the second logic configured to:
        transition the first logic to the low power mode, wherein the transitioning to the low power mode comprises suspending a communications connection between the wireless communications device and another wireless communications device; and
        transition the first logic to an active mode after a designated period of time determined based on estimated average power characteristics of the wireless communications devices during reestablishment of the communications connection and while the communications connection is active, wherein the transitioning to the active mode reestablishes the communications connection between the wireless communications device and the other wireless communications device.

11. The device of claim 10, wherein second logic is further configured to:

transmit a low power mode command from a first link layer of the wireless communications device to a second link layer of the other wireless communications device.

12. The device of claim 11, wherein the designated period of time is specified in the low power mode command.

13. The device of claim 12, wherein the designated period of time is determined based on one or more of an estimated average power consumed during reestablishment of the communications connection, an estimated average power consumed while the communications connection is active, and an estimated time taken to reconnect or reestablish the communications connection.

14. The device of claim 10, wherein the wireless communications protocol is a Bluetooth Low Energy protocol.

15. The device of claim 10, wherein the first logic and the second logic are processor cores included in the wireless communications device.

16. A wireless communications device comprising:

an antenna;

a transceiver configured to send and receive signals via the antenna;

a processing device comprising:

a first logic configured to implement a host stack of a Bluetooth wireless communications protocol; and a second logic configured implement a controller stack of the Bluetooth wireless communications protocol, and the second logic configured to:

transition the first logic to a low power mode, wherein the transitioning to the low power mode comprises suspending a communications connection between the wireless communications device and another wireless communications device; and transition the first logic to an active mode after a designated period of time determined based on estimated average power characteristics of the wireless communications devices during reestablishment of the communications connection and while the communications connection is active, wherein the transitioning to the active mode reestablishes the communications connection between the wireless communications device and the other wireless communications device.

17. The device of claim 16, wherein second logic is further configured to:

receive a low power mode command from a first link layer of the other wireless communications device at a second link layer of the wireless communications device.

18. The device of claim 17, wherein the designated period of time is specified in the low power mode command.

19. The device of claim 16, wherein the wireless communications protocol is a Bluetooth Low Energy protocol.

20. The device of claim 16, wherein the first logic and the second logic are processor cores included in the wireless communications device.

* * * * *